United States Patent
Monticello et al.

(10) Patent No.: US 10,071,729 B2
(45) Date of Patent: Sep. 11, 2018

(54) TOW DAMPING SYSTEM

(71) Applicant: FORD GLOBAL TECHNOLOGIES, LLC, Dearborn, MI (US)

(72) Inventors: Andrew Monticello, Farmington Hills, MI (US); Lucian Lippok, Cologne (DE); Keith Weston, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 285 days.

(21) Appl. No.: 15/155,314

(22) Filed: May 16, 2016

(65) Prior Publication Data

US 2017/0327108 A1 Nov. 16, 2017

(51) Int. Cl.
*B60W 30/02* (2012.01)
*B60K 23/04* (2006.01)
*B60W 30/18* (2012.01)
*B60W 30/045* (2012.01)

(52) U.S. Cl.
CPC ............. *B60W 30/02* (2013.01); *B60K 23/04* (2013.01); *B60W 30/045* (2013.01); *B60W 30/18172* (2013.01); *B60K 2023/043* (2013.01); *B60K 2023/046* (2013.01); *B60Y 2300/18108* (2013.01); *B60Y 2300/28* (2013.01)

(58) Field of Classification Search
CPC .................. B60Y 2300/18108; B60Y 2300/28
See application file for complete search history.

(56) References Cited

U.S. PATENT DOCUMENTS

| | | | | |
|---|---|---|---|---|
| 5,079,708 A | * | 1/1992 | Brown | B60K 23/04 701/72 |
| 5,505,267 A | * | 4/1996 | Orbach | B60K 23/04 172/3 |
| 5,558,163 A | * | 9/1996 | Hollstein | A01B 67/00 172/2 |
| 5,747,683 A | * | 5/1998 | Gerum | B60T 8/1708 701/72 |
| 7,401,871 B2 | | 7/2008 | Lu et al. | |
| 8,285,450 B2 | * | 10/2012 | Ushiroda | B60T 8/1755 701/41 |
| 9,061,663 B2 | | 6/2015 | Wu | |
| 9,199,640 B2 | | 12/2015 | Weston et al. | |
| 2005/0065694 A1 | | 3/2005 | Nenninger | |
| 2008/0177454 A1 | * | 7/2008 | Bond | B60T 8/1708 701/70 |
| 2012/0095659 A1 | * | 4/2012 | Rodrigues | B60K 23/08 701/69 |
| 2012/0109471 A1 | * | 5/2012 | Wu | B60T 8/1708 701/49 |
| 2014/0236443 A1 | * | 8/2014 | Rodrigues | B60K 28/165 701/69 |
| 2016/0023658 A1 | * | 1/2016 | Kelly | B60W 50/085 701/94 |
| 2016/0318493 A1 | * | 11/2016 | Drako | B60K 17/145 |
| 2016/0318509 A1 | * | 11/2016 | Rycroft | B60T 8/1755 |

\* cited by examiner

*Primary Examiner* — Edwin A Young
*Assistant Examiner* — Timothy Hannon
(74) *Attorney, Agent, or Firm* — James Dottavio; Brooks Kushman P.C.

(57) ABSTRACT

A vehicle includes a trailer hitch, an axle having an electronic limited slip differential, and a controller. The electronic limited slip differential includes a variable torque capacity lockup clutch. The controller is programmed to, in response to detecting the presence of a trailer connected to the trailer hitch and an increase in vehicle speed, increase the lockup clutch torque by a first torque adjustment.

19 Claims, 2 Drawing Sheets

TOW DAMPING SYSTEM

TECHNICAL FIELD

The present disclosure relates to a tow damping system for vehicles.

BACKGROUND

A trailer that is being towed by a moving vehicle may have the propensity to apply a force on the back of a vehicle. The force applied to the vehicle by the trailer may be in the direction that the trailer is moving, which may not be the same direction that the vehicle is moving. This force may cause the rear end of the vehicle to travel in a path that is wider than the front end of the vehicle causing oversteer. Oversteer may compromise the stability of the vehicle and/or may cause a jack-knifing event.

SUMMARY

A vehicle includes a trailer hitch, an axle having an electronic limited slip differential, and a controller. The electronic limited slip differential includes a variable torque capacity lockup clutch. The controller is programmed to, in response to detecting the presence of a trailer connected to the trailer hitch and an increase in vehicle speed, increase the lockup clutch torque by a first torque adjustment.

A vehicle includes an electronic limited slip differential and a controller. The electronic limited slip differential includes a lockup clutch that is configured to decrease the relative speeds of opposing wheels on an axle as lockup clutch torque increases. The controller is programmed to, in response to detecting the presence of a trailer connected to the vehicle, forward motion of the vehicle, and an increase in a steering wheel angle, increase the lockup clutch torque by a first torque adjustment.

A vehicle controller includes input channels, output channels, and control logic. The input channels are configured to receive signals indicative of the presence of a trailer connection, vehicle speed, steering wheel angle, and braking requests. The output channels configured to provide commands to adjust the torque of a differential lockup clutch. The control logic is programmed to, in response to the presence of a trailer connection, an increase in vehicle speed, and an increase in steering wheel angle, increase the lockup clutch torque.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
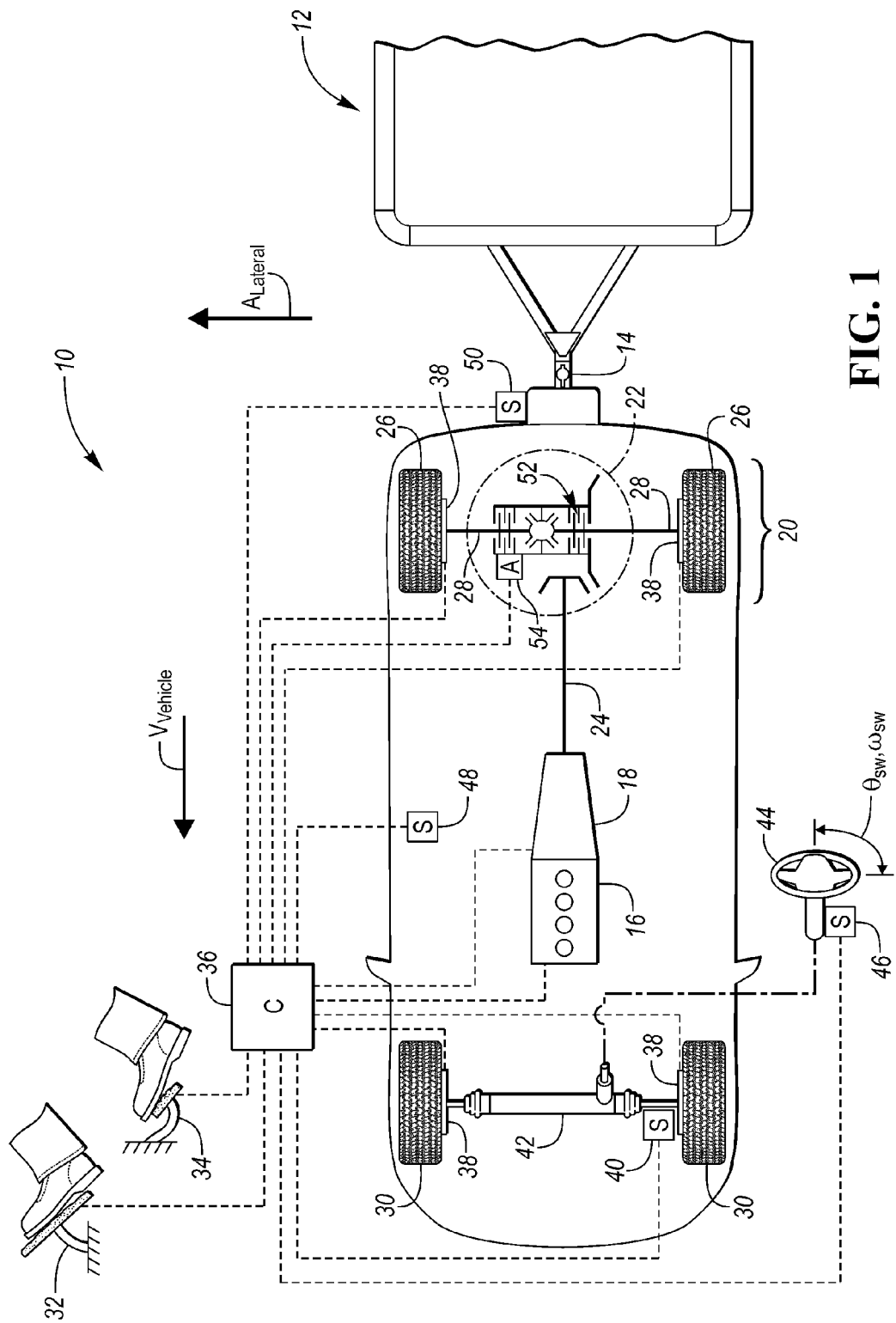
FIG. 1 is a schematic diagram representative of a vehicle and a trailer that is connected to a towing connection of the vehicle.

Referring to FIG. 1, a schematic diagram representative of a vehicle 10 and a trailer 12 that is connected to a towing connection or hitch 14 of the vehicle 10. The vehicle 10 includes a powertrain. The powertrain includes both power generating components (i.e., engines or electric motors) and the drivetrain. The drivetrain is the group of components that deliver power to the driving wheels, excluding the power generating components. In contrast, the powertrain is considered to include both the power generating components and the drivetrain. The powertrain includes both an engine 16 and a transmission 18. The transmission 18 may be configured to provide multiple gear ratios between an input and an output of the transmission 18. The transmission 18 may be connected to an axle 20 through a series of drivetrain components. More specifically, the transmission 18 may be connected to a differential 22 of the axle 20 through a drive shaft 24. The differential 22 in turn may be connected to the hubs of drive wheels 26 through half shafts 28. There may be additional drivetrain connections between the transmission 18 and the drive wheels 26. For example, constant-velocity joints (not shown) may connect the transmission 18 to the driveshaft 24, the driveshaft 24 to the differential 22, the differential 22 to the half shafts 28, and/or the half shafts 28 to hubs of the driving wheels 26.

The driving wheels 26 depicted in FIG. 1 are shown as the rear wheels of the vehicle 10. However, it should be understood that the front wheels 30 may also be driving wheels. For example, the front wheels 30 may be connected to the transmission 18 through a series of drivetrain components such as drive shafts, half shafts, differentials, transfer cases, constant-velocity joints, etc. in a manner similar to how the rear wheels are connected to the transmission 18, but not necessarily in the same order or configuration. Furthermore, although an engine 16 is shown to be the power generating component of the powertrain, other power generating components (i.e., electric motors or fuel cells) may be used in place of or in addition to (such as with hybrid vehicles) the engine 16.

It should be understood that the vehicle configuration described herein is merely exemplary and is not intended to be limited. Other non-hybrid, electric, or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

An operator of the vehicle 10 may control the speed of the vehicle and/or the torque that is being applied at the drive wheels 26 of the vehicle 10 by depressing either an accelerator pedal 32 or a brake pedal 34. Depressing the accelerator pedal 32 may coincide with a request for an increase in vehicle speed and/or torque. Depressing the brake pedal 34 may coincide with a request for a decrease in vehicle speed and/or torque. Depressing either the accelerator pedal 32 or brake pedal 34 may send either an acceleration request or a breaking request, respectively, to a vehicle controller 36. The vehicle controller 36, in turn, may adjust a speed and/or torque of the engine 16, cause a shift in the transmission 18, or adjust a torque that is being applied to brakes 38, based on the acceleration or braking request and the current vehicle speed $V_{vehicle}$. A speed sensor 40 may be configured to communicate the vehicle speed to the controller 36. The speed sensor 40 may be configured to calculate the rotational speed of one or more of the vehicle wheels and the controller 36 may include an algorithm that is configured to determine the current vehicle speed $V_{vehicle}$ based on the rotational speed of one or more of the vehicle wheels.

The vehicle 10 may also include a steering system 42 that is configured to turn the front wheels 30 based on a user input received from a steering wheel 44. A steering wheel sensor 46 may be configured to communicate the current angular displacement $\Theta_{sw}$ of the steering wheel 44 and/or the current angular speed $\omega_{sw}$ of the steering wheel 44 to the controller 36. The current angular displacement $\Theta_{sw}$ and/or the current angular speed $\omega_{sw}$ of the steering wheel 44 may include angular displacements and angular speeds, respectively, in either a clockwise or counterclockwise direction.

Other additional sensors may also communicate various states of the vehicle 10 and/or the trailer 12 to the controller 36. For example, the vehicle 10 may include a lateral acceleration sensor 48 that is configured to communicate the lateral acceleration $A_{lateral}$ of the vehicle to the controller 36 and a trailer sensor 50 that is configured to communicate whether or not a trailer is connected to the towing connection or hitch 14.

The differential 22 may be an electronically controlled limited slip differential. The differential 22 may include a lockup clutch 52. The lockup clutch 52 may be a variable torque capacity lockup clutch that is configured to decrease the relative speeds of the opposing wheels 26 on the axle 20 as the lockup clutch torque increases. The torque of the lockup clutch 52 may be adjusted between a completely disengaged condition and a completely locked condition, including a slipping condition between the completely disengaged condition and completely locked condition. As the torque on the lockup clutch 52 increases during the slipping condition, the relative speeds of the opposing wheels 26 on the axle 20 will decrease. When the lockup clutch 52 obtains a torque that is sufficient to lock the differential 22, the speeds of the opposing wheels 26 become synchronized and the relative speeds of the opposing wheels 26 becomes zero. The differential 22 may include an actuator 54 that is configured to engage/disengage lockup clutch 52 by increasing or decreasing the torque acting on the lockup clutch 52. The actuator 54 may receive signals from the controller to increase or decrease the torque on the lockup clutch 52. The actuator 54 may be electrical solenoid, hydraulic valve, or any other device known in the art that is capable of increasing and decreasing torque on a clutch. The actuator 54 may also act as a sensor that communicates the amount of torque acting on the lockup clutch 52 back to the controller 36.

While illustrated as one controller, the controller 36 may be part of a larger control system and may be controlled by various other controllers throughout the vehicle 10, such as a vehicle system controller (VSC). It should therefore be understood that the controller 36 and one or more other controllers can collectively be referred to as a "controller" that controls various actuators in response to signals from various sensors to control functions the vehicle 10 or vehicle subsystems. The controller 36 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 36 in controlling the vehicle 10 or vehicle subsystems.

Control logic, algorithms, or functions performed by the controller 36 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 36 may be configured to receive various states or conditions of the various vehicle components illustrated in FIG. 1 via electrical signals. The electrical signals may be delivered to the controller 36 from the various components via input channels. Additionally, the electrical signals received from the various components may be indicative of a request or a command to change or alter a state of one or more of the respective components of the vehicle 10. The controller 36 includes output channels that are configured to deliver requests or commands (via electrical signals) to the various vehicle components. The controller 36 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore an output channel into one element may operate as an input channel to another element and vice versa.

Figure 2:
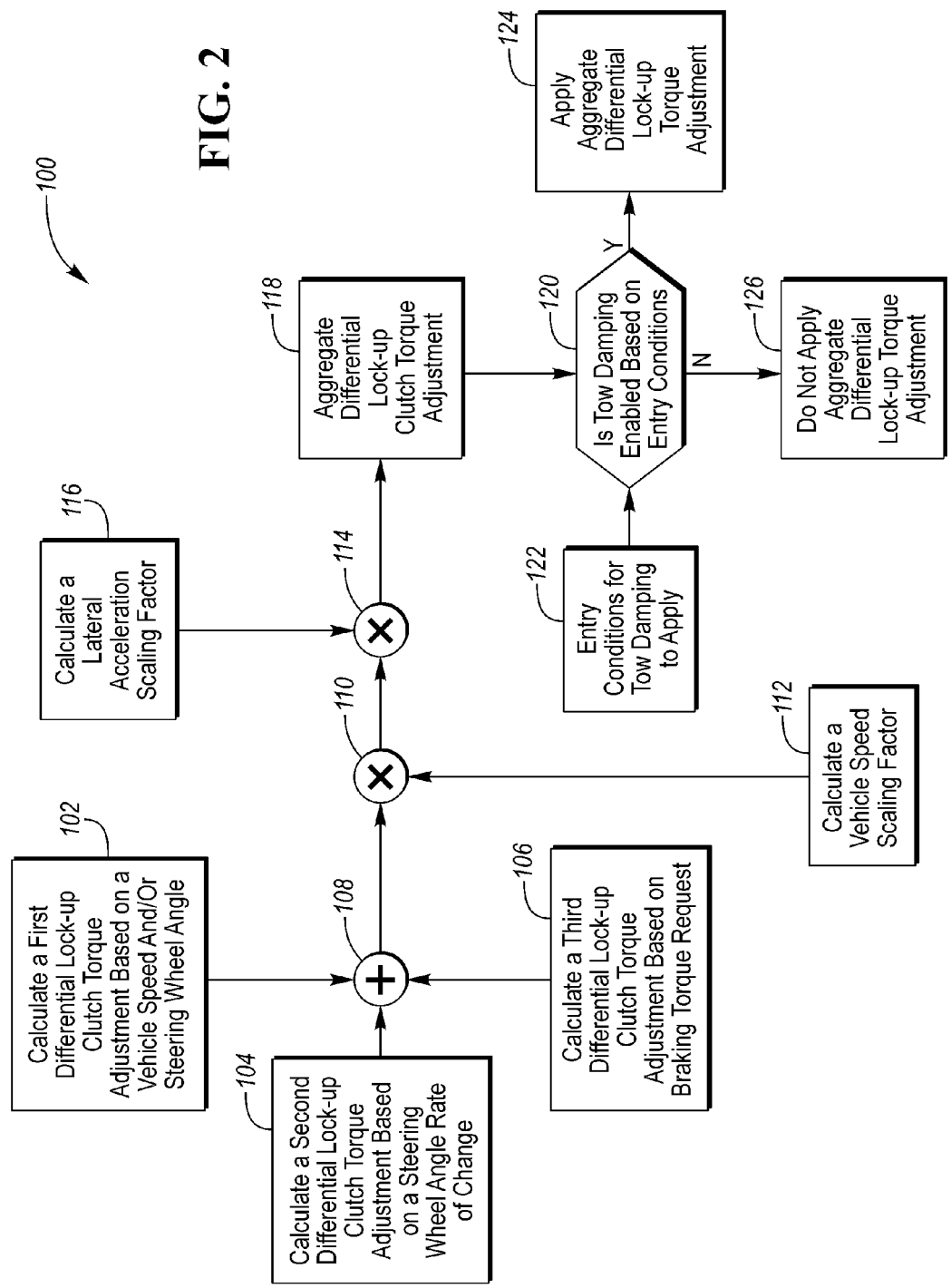
FIG. 2 is a flowchart illustrating a control method for adjusting the torque of a differential lockup clutch in a vehicle when towing a trailer.

Referring to FIG. 2, a flowchart representative of a control method 100 for adjusting the torque of the lockup clutch 52 of the differential 22 during a towing operation (i.e., the vehicle 10 towing the trailer 12) is illustrated. The control method 100 may be implemented in the controller 36 as described above. The control method 100 may be referred to as a tow damping control method. Electronically controlled limit slip differential systems may be utilized to improve vehicle handling. Vehicle handling may be considered to be improved when there is less yaw error between the driver demanded yaw and actual yaw, increased lateral acceleration, less understeer, etc. The tow damping control method, on the other hand, increases understeer making the vehicle more stable during trailer towing. The increased stability may be more prevalent during dynamic events such as turning or changing lanes.

The method 100 begins by calculating a first differential lockup clutch torque adjustment at block 102, a second differential lockup clutch torque adjustment at block 104, and a third differential lockup clutch torque adjustment at block 106. The first differential lockup clutch torque adjustment is based on the vehicle speed $V_{vehicle}$ and/or the current angular displacement $\theta_{sw}$ of the steering wheel 44. The first differential lockup clutch torque adjustment may be stored as a 3-D lookup table within the controller 36 based on vehicle speeds $V_{vehicle}$ and angular displacements $\theta_{sw}$ of the steering wheel 44. The first differential lockup clutch torque adjustment may be configured to incrementally increase as the vehicle speed $V_{vehicle}$ increases and/or as the current angular displacement $\theta_{sw}$ of the steering wheel 44 increases. The second differential lockup clutch torque adjustment is based on the steering wheel angle rate of change (i.e., the current angular speed $\omega_{sw}$ of the steering wheel 44). The second differential lockup clutch torque adjustment may be configured to incrementally increase as the steering wheel angle rate of change $\omega_{sw}$ increases. The second differential lockup clutch torque adjustment may be limited such that it has a maximum value when the steering wheel angle rate of change $\omega_{sw}$ is at or above an upper angle rate threshold and a zero value when the steering wheel angle rate of change $\omega_{sw}$ is below a lower angle rate threshold. The third differential lockup clutch torque adjustment is based on a braking torque request from the vehicle operator. The third differential lockup clutch torque adjustment may be configured to incrementally increase as the braking torque request increases. The third differential lockup clutch torque adjustment may be limited such that it has a maximum value when the braking torque request is at or above a braking torque threshold.

The first, second, and third differential lockup clutch torque adjustments are then added together at summation node 108. The summation of the first, second, and third differential lockup clutch torque adjustments are then multiplied by a vehicle speed scaling factor at a first multiplication node 110. The vehicle speed scaling factor is first calculated at block 112 and then input into the first multiplication node 110. The vehicle speed scaling factor is configured to increase as vehicle speed $V_{vehicle}$ increases. The vehicle speed scaling factor may be configured to incrementally increase between a lower vehicle speed threshold and an upper vehicle speed threshold. The vehicle speed scaling factor may have a value of zero when vehicle speed $V_{vehicle}$ is below the lower vehicle speed threshold and a value of one when vehicle speed $V_{vehicle}$ is above the upper vehicle speed threshold. The summation of the first, second, and third differential lockup clutch torque adjustments are next multiplied by a lateral acceleration scaling factor at a second multiplication node 114. The lateral acceleration scaling factor is first calculated at block 116 and then input into the second multiplication node 114. The lateral acceleration scaling factor may be either configured to increase or decrease as lateral acceleration $A_{lateral}$ increases. For example, the lateral acceleration scaling factor may be configured to incrementally decrease between a first lower lateral acceleration threshold and a first upper lateral acceleration threshold. The lateral acceleration scaling factor may have a value of up to one when lateral acceleration $A_{lateral}$ is at or below the first lower lateral acceleration threshold and a value of down to zero when lateral acceleration $A_{lateral}$ is at or above the first upper lateral acceleration threshold. The lateral acceleration scaling factor may then be configured to incrementally increase between a second lower lateral acceleration threshold (which is greater than or equal to the first upper lateral acceleration threshold) and a second upper lateral acceleration threshold. The lateral acceleration scaling factor may have a value of down to zero when lateral acceleration $A_{lateral}$ at or just below the second lower lateral acceleration threshold and a value of up to one when lateral acceleration $A_{lateral}$ is at or above the second upper lateral acceleration threshold. The lateral acceleration scaling factor may then again be configured to incrementally decrease to a value of down to zero as lateral acceleration $A_{lateral}$ increases. For example, the lateral acceleration scaling factor may then again be configured to incrementally decrease to a value of down to zero when lateral acceleration $A_{lateral}$ increases to values above the second upper lateral acceleration threshold. The lateral acceleration scaling factor may be stored in a 2-D lookup table in the vehicle controller 36.

The vehicle speed and the lateral acceleration scaling factors prevent the lockup clutch 52 of the differential 22 from locking when maneuverability (and therefore a speed differential between the opposing wheels 26 on the axle 20) is desirable. For example, maneuverability may be desirable during low vehicle speeds when parking the vehicle 10 and trailer 12 or during high acceleration events of the vehicle 10 that may cause lateral acceleration. Increasing torque on the lockup clutch 52 of the differential 22 while parking or during high acceleration events may cause binding or understeer when attempting to turn the vehicle 10, which may be undesirable during such events.

The second multiplication node 114 outputs an aggregate differential lockup clutch torque adjustment that is represented by Block 118. The aggregate differential lockup clutch torque adjustment is then input into decision block 120. Decision block 120 determines whether or not tow damping is enabled based on entry conditions. Tow damping may be enabled when either all of or some of the entry conditions have been met. The entry conditions are first determined at block 122 and input into the decision block 120. The entry conditions may include the trailer 12 being connected to the towing connection or hitch 14, the vehicle 10 not driving in a reverse direction, the vehicle 10 driving in a forward direction, and/or the vehicle 10 speed being above a threshold speed. If the entry conditions are such that tow damping is enabled at decision block 120, the method moves on to block 124 where the aggregate differential lockup clutch torque adjustment is applied to the lockup clutch 52 of the differential 22 (i.e., the torque applied to the lockup clutch 52 is increased by the aggregate differential lockup clutch torque adjustment). If the entry conditions are such that the tow damping is not enabled at decision block 120, the method moves on to block 126 where the aggregate differential lockup clutch torque adjustment is not applied to the lockup clutch 52 of the differential 22 (i.e., the torque applied to the lockup clutch 52 is not increased by the aggregate differential lockup clutch torque adjustment). If the entry conditions are such that the tow damping is not enabled, the lockup clutch 52 of the differential 22 may be configured to operate as a limited slip differential to improve vehicle handling as described above. Although FIG. 1 depicts the differential 22 located on a rear axle of the vehicle 10, the method 100 may also be applicable to control a differential located on a front axle of a vehicle during a towing operation.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a trailer hitch;
   an axle having an electronic limited slip differential that includes a variable torque capacity lockup clutch; and
   a controller programmed to, in response to detecting the presence of a trailer connected to the trailer hitch and an increase in vehicle speed, increase the lockup clutch torque by a first torque adjustment.

2. The vehicle of claim 1, wherein the controller is programmed to, in response to an increase in a steering wheel angle, increase the first torque adjustment.

3. The vehicle of claim 2, wherein the controller is programmed to, in response to a steering wheel angle rate of change exceeding an angle rate threshold, increase the lockup clutch torque by a second torque adjustment.

4. The vehicle of claim 3, wherein the controller is programmed to, in response to a braking request, increase the lockup clutch torque by a third torque adjustment.

5. The vehicle of claim 4, wherein the first torque adjustment, second torque adjustment, and third torque adjustment are multiplied by a scaling factor, the scaling factor having a value that increases as the vehicle speed increases from a lower speed threshold to an upper speed threshold.

6. The vehicle of claim 5, wherein the value of the scaling factor is zero when the vehicle speed is below the lower speed threshold.

7. The vehicle of claim 5, wherein the value of the scaling factor is one when the vehicle speed is above the upper speed threshold.

8. The vehicle of claim 4, wherein the first torque adjustment, the second torque adjustment, and the third torque adjustment are multiplied by a scaling factor that decreases as a lateral acceleration of the vehicle increases from a lower acceleration threshold to an upper acceleration threshold.

9. The vehicle of claim 8, wherein the value of the scaling factor is zero when the lateral acceleration is above the upper acceleration threshold.

10. The vehicle of claim 8, wherein the value of the scaling factor is one when the lateral acceleration is below the lower acceleration threshold.

11. A vehicle comprising: an electronic limited slip differential including a lockup clutch configured to decrease the relative speeds of opposing wheels on an axle as lockup clutch torque increases; and a controller programmed to, in response to detecting a presence of a trailer connected to the vehicle, forward motion of the vehicle; and an increase in a steering wheel angle, increase the lockup clutch torque by a first torque adjustment,
   wherein the controller is programmed to, in response to an increase in a vehicle speed, increase the first torque adjustment.

12. The vehicle of claim 11, wherein the controller is programmed to, in response to a braking request, increase the lockup clutch torque by a second torque adjustment.

13. The vehicle of claim 12, wherein the controller is programmed to, in response to a steering wheel angle rate of change exceeding an angle rate threshold, increase the lockup clutch torque by a third torque adjustment.

14. The vehicle of claim 13, wherein the first torque adjustment, the second torque adjustment, and the third torque adjustment are multiplied by a scaling factor, the scaling factor having a value that increases as the vehicle speed increases from a lower speed threshold to an upper speed threshold.

15. The vehicle of claim 13, wherein the first torque adjustment, the second torque adjustment, and the third torque adjustment are multiplied by a scaling factor that decreases as a lateral acceleration of the vehicle increases from a lower acceleration threshold to an upper acceleration threshold.

16. A vehicle controller comprising:
    input channels configured to receive signals indicative of a presence of a trailer connection, vehicle speed, steering wheel angle, and braking requests;
    output channels configured to provide commands to adjust a torque of a differential lockup clutch; and
    control logic programmed to, in response to the presence of a trailer connection, an increase in vehicle speed, and an increase in steering wheel angle, increase the lockup clutch torque.

17. The vehicle of claim 16, wherein the control logic is programmed to, in response to a steering wheel angle rate of change exceeding an angle rate threshold, further increase the lockup clutch torque.

18. The vehicle of claim 17, wherein the control logic is programmed to, in response to a braking request, further increase the lockup clutch torque.

19. The vehicle of claim 18, wherein the control logic is programmed to,
    in response to the vehicle speed exceeding a speed threshold, multiply the increase in the lockup clutch torque by a first scaling factor, and
    in response to a lateral acceleration being less than an acceleration threshold, multiply the increase in the lockup clutch torque by a second scaling factor.

* * * * *